United States Patent
Li et al.

(10) Patent No.: US 9,071,448 B2
(45) Date of Patent: Jun. 30, 2015

(54) METHOD AND A SYSTEM FOR TRANSFERRING DATA RELATED TO A CALLING CARD FUNCTION IN TELECOMMUNICATIONS NETWORK, AS WELL AS A SERVER, A COMPUTER PROGRAM AND A COMPUTER PROGRAM PRODUCT

(75) Inventors: Xiangyang Li, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/395,253

(22) PCT Filed: Sep. 11, 2009

(86) PCT No.: PCT/CN2009/073884
§ 371 (c)(1),
(2), (4) Date: May 31, 2012

(87) PCT Pub. No.: WO2011/029237
PCT Pub. Date: Mar. 17, 2011

(65) Prior Publication Data
US 2012/0237013 A1     Sep. 20, 2012

(51) Int. Cl.
*H04M 15/00*  (2006.01)
*H04L 12/14*  (2006.01)
(Continued)

(52) U.S. Cl.
CPC .......... *H04L 12/14* (2013.01); *H04L 12/1457* (2013.01); *H04M 15/00* (2013.01); *H04M 15/755* (2013.01); *H04M 15/7553* (2013.01); *H04M 15/7556* (2013.01); *H04M 15/765* (2013.01); *H04L 12/1403* (2013.01); *H04L 12/1464* (2013.01); *H04M 15/57* (2013.01); *H04M 17/02* (2013.01); *H04M 17/103* (2013.01)

(58) Field of Classification Search
CPC ... H04M 17/00; H04M 15/00; H04M 17/103; H04M 15/48; H04M 15/77
USPC .......................... 379/114.15, 114.2; 370/352
See application file for complete search history.

(56) References Cited

U.S. PATENT DOCUMENTS

| | | |
|---|---|---|
| 6,510,216 B1 | 1/2003 | Burr et al. |
| 2004/0156340 A1* | 8/2004 | Madour .................. 370/335 |
| 2007/0061271 A1* | 3/2007 | Ala-Luukko ............. 705/64 |

(Continued)

FOREIGN PATENT DOCUMENTS

| | | |
|---|---|---|
| CN | 101257395 A | 9/2008 |
| WO | WO 99/25106 A2 | 5/1999 |
| WO | WO 2008/026154 | 3/2008 |

OTHER PUBLICATIONS

International Search Report for PCT/CN2009/073884 dated Jun. 3, 2010.

(Continued)

*Primary Examiner* — Quoc D Tran
(74) *Attorney, Agent, or Firm* — Fay Sharpe LLP

(57) ABSTRACT

The invention concerns a system for transferring data related to a calling card function between a server (1001) and a network device (1002, 1003, 1004, 1200, 1201) in a telecommunications network (1000), wherein said server (1001) is adapted to provide said calling card function, and in that said server (1001) is adapted to transfer said data to said network device (1002, 1003, 1004, 1200, 1201) via a packet switched link (1105, 1106, 1107, 1116, 1117).

12 Claims, 6 Drawing Sheets

(51) Int. Cl.
*H04M 17/02* (2006.01)
*H04M 17/00* (2006.01)

(56) References Cited

U.S. PATENT DOCUMENTS

2007/0156413 A1* 7/2007 Cai et al. .......................... 705/1
2007/0243876 A1* 10/2007 Duan ........................... 455/445
2008/0162705 A1* 7/2008 Cai et al. ....................... 709/228
2009/0097619 A1* 4/2009 Jackson et al. ............. 379/88.17
2011/0296035 A1* 12/2011 Koskinen et al. ............. 709/227

OTHER PUBLICATIONS

European Search Report, dated Jun. 18, 2003.

* cited by examiner

METHOD AND A SYSTEM FOR TRANSFERRING DATA RELATED TO A CALLING CARD FUNCTION IN TELECOMMUNICATIONS NETWORK, AS WELL AS A SERVER, A COMPUTER PROGRAM AND A COMPUTER PROGRAM PRODUCT

BACKGROUND OF THE INVENTION

The invention relates to a system for transferring data related to a calling card function in a telecommunications network according to the preamble of claim 1, a server according to the preamble of claim 9, a method according to the preamble of claim 10, a computer program according to the preamble of claim 13 and a computer program product according to the preamble of claim 14.

Calling card services are provided today in a packet switched network. For this packet switched telecommunications networks, like the internet protocol multimedia subsystem, the calling card functionality, e.g. interactive voice response and charging, is provided by transferring the data between a serving call session control function server and one or more servers providing calling card charging system and the calling card functionality.

In existing solutions the server providing the online charging system is already part of the packet switched telecommunications network and uses a packet switching protocol for transferring the data. However the calling card charging system is part of a circuit switched telecommunications network, e.g. the well known public switched telephone network, using a circuit switching protocol.

Therefore the calling card charging system is connected to the packet switched telecommunications network via a gateway. The gateway translates from a circuit switching protocol to a packet switching protocol and vice-versa.

A reference model for online charging for a service in a packet switched telecommunications network, like the IP multi-media subsystem, is defined by current telecommunications standards. An example is the Diameter Ro interface defined by 3GPP 32.296 V. 8.3.0, 32.299 V.9.0.0 section 5.2.1 and 32.260 V. 9.0.0 section 5.3.2.

However the reference model for online charging enables credit control and authentication only. There is no fully internet protocol based calling card functionality defined in the reference model.

Currently not only the online charging system in the packet switched network is used, but also the additional calling card charging system is maintained in the circuit switched network. This calling card charging system is connected to the packet switched network via the gateway. This means that a time consuming and costly translation from the packet switching protocol to the circuit switching protocol and vice-versa has to be performed by the gateway in order to provide the calling card service.

The object of the invention is thus to provide an efficient calling card solution in a packet switched network.

SUMMARY OF THE INVENTION

This object is achieved by a system according to the teaching of claim 1, a server according to the teaching of claim 9, a method according to the teaching of claim 10, a computer program according to the teaching of claim 13 and computer program product according to the teaching of claim 14.

The main idea of the invention is to form a system for transferring data related to a calling card function between a server and a network device in a telecommunications network, wherein said server is adapted to provide said calling card function, and wherein said server is adapted to transfer said data to said network device via a packet switched link.

This means that the calling card function is implemented on a server in the packet switched network. Additionally the packet switched protocol and the associated interfaces on the server and said network device are adapted, for example to enable interactive voice response for service access like account balance information, personal identification number modification and balance transfer.

Further developments of the invention can be gathered from dependent claims and the following description.

BRIEF DESCRIPTION OF THE DRAWINGS

In the following the invention will be explained further making reference to the attached drawings.

DETAILED DESCRIPTION OF THE INVENTION

A system according to the invention comprises a server providing a calling card function and a network device being connected via a packet switched link.

Figure 1:
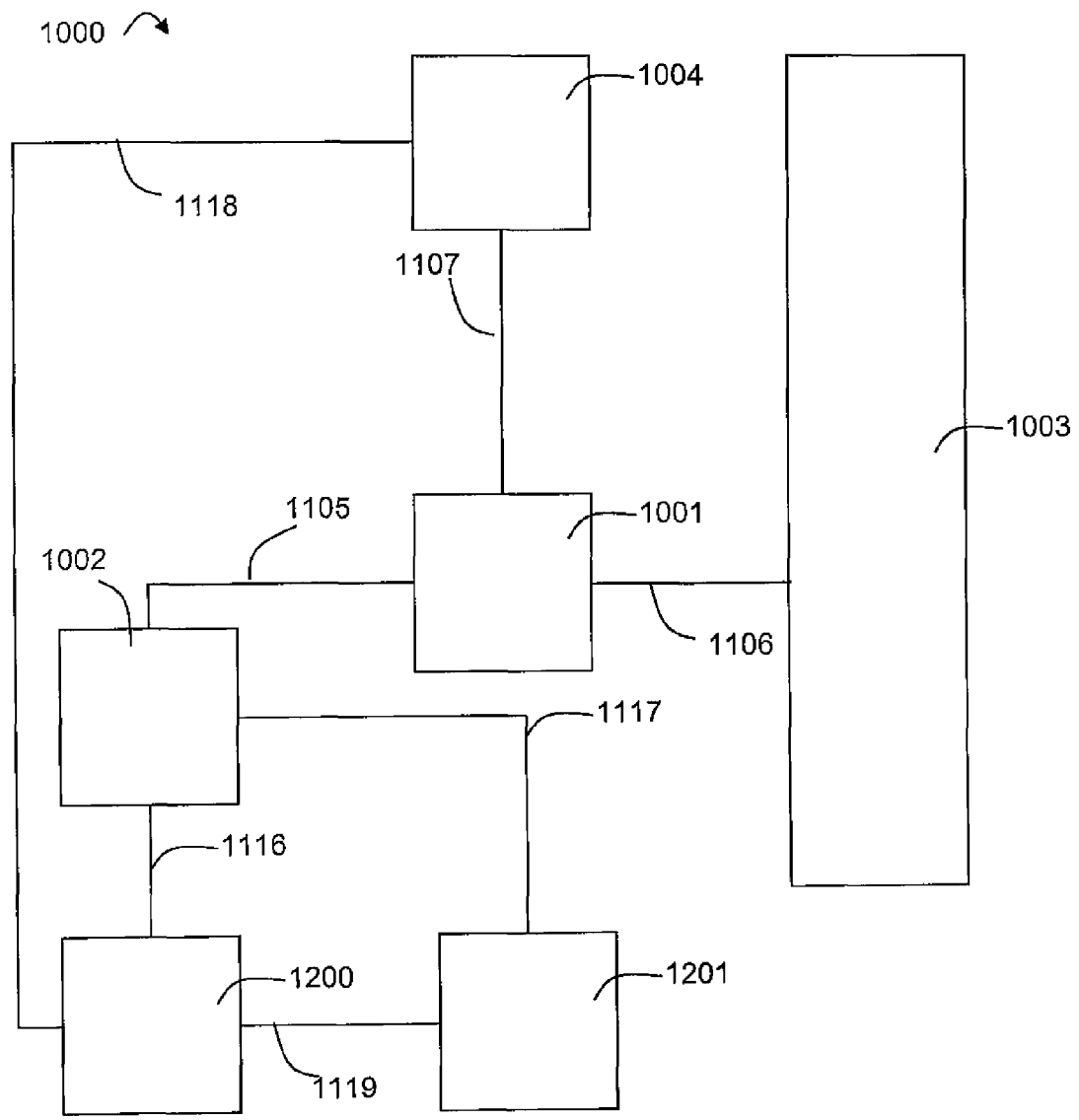
FIG. 1 schematically shows a part of a telecommunications network.

An exemplary system is depicted in FIG. 1 as part of a telecommunications network 1000 and described below.

In said exemplary system said server is a calling card function server 1001. Furthermore said network device according to said example is a call session control function server 1002, an online charging system 1003, a media resource function server 1004, a first user equipment and a second user equipment.

Said calling card function server 1001 is connected to said call session control function server 1002 via a first packet switched link 1105.

Additionally said calling card function server 1001 is connected to said online charging system 1003 via a second packet switched link 1106.

Furthermore said calling card function server 1001 is connected to said media resource function server 1004 via a third packet switched link 1107

Additionally data transferred via said first packet switched link 1105 is transferred using the session initiation protocol based internet protocol multimedia subsystem service control. (Said session initiation protocol and said internet protocol multimedia subsystem service control interface are very well known to a person skilled in the art as SIP and ISC respectively and not explained here further.)

Additionally data transferred via said second packet switched link 1106 is transferred either using the internet protocol multimedia subsystem online charging interface (well known as Diameter Ro interface) or using the session initiation protocol based Mr interface (well known as SIP Mr interface). The protocol used depends on the content of the data to be transferred and is selected as described below.

Additionally data transferred via said third packet switched link 1107 is transferred using either the session initiation protocol based media server control mark-up language (well known as SIP MSCML) or using said session initiation protocol. The protocol used depends on the content of the data to be transferred and is selected as described below.

Furthermore said first user equipment is a first session initiation protocol phone 1200 (well known as SIP phone) that is connected to said call session control function server 1002 via a fourth packet switched link 1116.

Furthermore said second user equipment is a second session initiation protocol phone 1201 that is connected to said call session control function server 1002 via a fifth packet switched link 1117.

For example said session initiation protocol is used for transferring data via said fourth packet switched link 1116 or said fifth packet switched link 1117.

A sixth packet switched link 1118 connects said first session initiation protocol phone 1200 and said media resource function server 1004. In said example a real time transport protocol is used for transferring data via said sixth packet switched link. (Said real time transport protocol is well known to a person skilled in the art as RTP.)

Additionally a seventh packet switched link 1119 connects said first session initiation protocol phone 1200 and said second session initiation protocol phone 1201. In said example said real time transport protocol is used for transferring data via said seventh packet switched link.

As depicted in FIG. 1 said first user equipment 1200 and said second user equipment 1201 are connected to the call session control function server 1002 directly. This connection may also be established via several other network nodes in said telecommunications network 1000, or even between several different telecommunications networks. The invention applies to this more general network setup as well.

The invention applies likewise if the first user equipment 1200 or the second user equipment 1201 is not in a packet switched network. In this case said call session control function server 1001 is adapted to communicate with said first user equipment 1200 or said second user equipment 1201 via for example a circuit switched network directly or using a gateway.

Said first user equipment 1200 or said second user equipment 1201 may be any other type of device allowing access to said telecommunications network 1000, for example any type of internet protocol phone.

All of the aforementioned packet switched links may be any type of packet switched link based for example on any of the protocols of the Internet Protocol Suite (very well known to a person skilled in the art as TCP/IP).

All or some of the aforementioned servers may be combined in any way to a single server or several combined servers offering the corresponding functions.

Any of the aforementioned servers or user equipments may be connected via one or more other nodes of said telecommunications network 1000 instead of being directly linked to each other.

The invention applies likewise in case the aforementioned servers or user equipments are distributed through different telecommunications networks.

Figure 2:
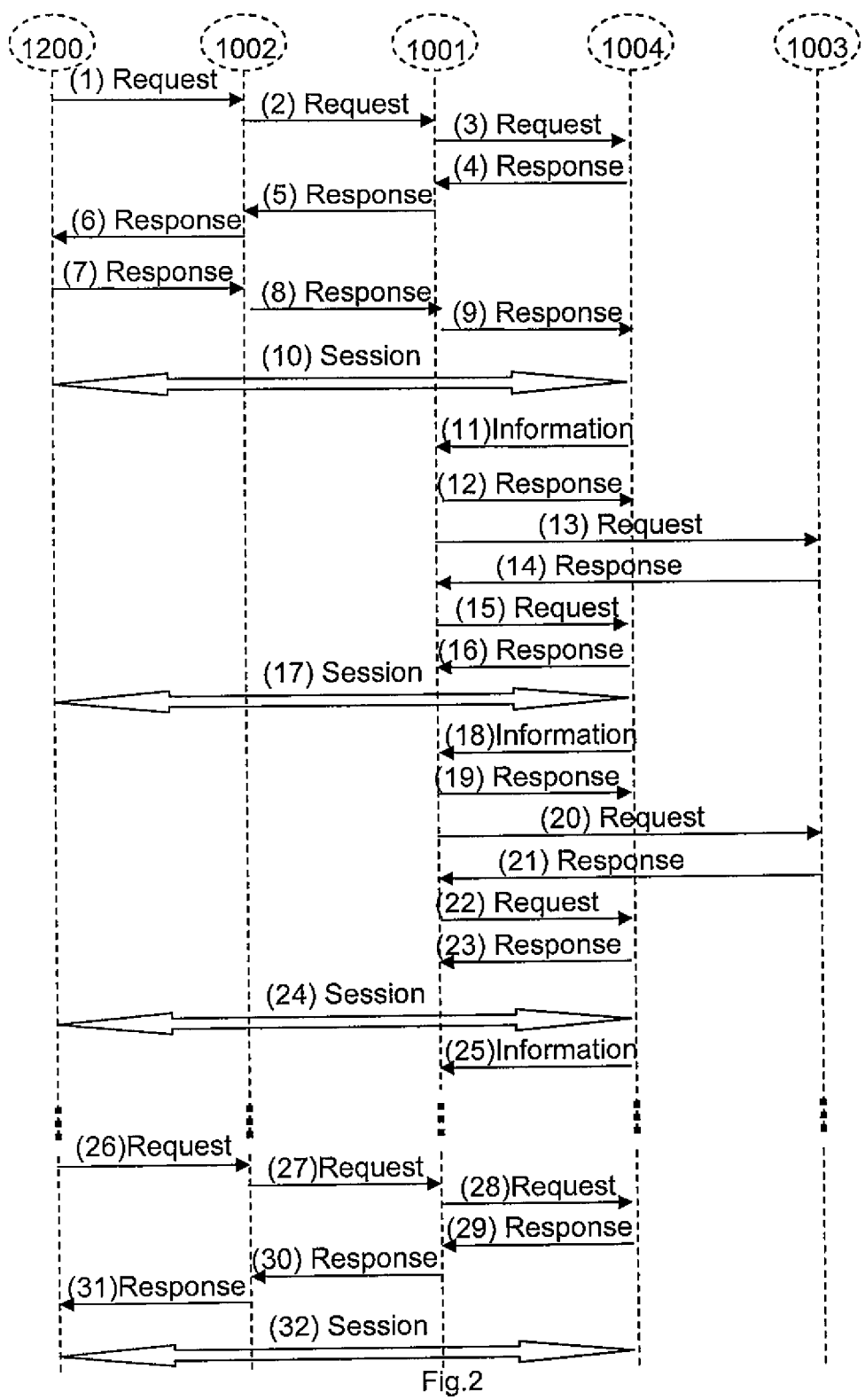
FIG. 2 schematically shows a first sequence diagram, showing some typical sequences in a first method according to the invention.

FIG. 2 schematically shows some sequences in a first method according to the invention. The goal of said first message is to enable a first user of said first session initiation protocol phone 1200 to use a calling card in an entirely packed switched telecommunications network 1000 to access or manage his or her calling card account on said online charging system 1003.

Said first method according to the invention and a first example of an implementation of said first method are described below making reference to FIG. 2.

Said calling card is for example purchased by said first user in a retail store selling calling cards. Alternatively a virtual calling card may be bought online or from said retail store.

Said calling card contains a first identifier, for example a calling card number or a string identifying said calling card. Said first identifier is associated with a calling card account.

Additionally said calling card is associated for example with a personal identification number (well known as PIN). Instead of a personal identification number any other type of personal identification, like a password, may be used.

Said calling card account contains a predetermined credit, for example a certain amount of minutes or units, which said calling card can be used for in said telecommunications network 1000.

According to said example said calling card number, said personal identification number and said predetermined credit are stored in a data base on said online charging system 1003, by an operator of said calling card functionality previously to selling said calling card via said retail store.

Said first method starts when an instruction 1, Request, is received by said call session control function server 1002.

To that end said call session control function server 1002 is adapted to monitor all incoming messages, to determine the receipt of said instruction 1 according to methods for controlling call sessions and to start said first method.

Such methods are well known to the person skilled in the art. In said first example the serving call session control function of the internet protocol multimedia subsystem (well known as S-CSCF) is used.

In said first example said instruction 1 is a session initiation protocol message 1, INVITE, including a second identifier, identifying said first session initiation protocol phone 1200 and a third identifier, identifying said calling card function server 1001.

According to said first example, said second identifier and said third identifier are included in said message 1 as a session description protocol description. (Said session description protocol is well known to a person skilled in the art as SDP.)

Said session description protocol description additionally may contain information about the codex supported by said first session initiation protocol phone 1200.

According to said first method, said second identifier contains a first real time transport protocol address of said first session initiation protocol phone 1200.

According to said first example said third identifier is a first phone number or simply a name identifying said operator of said calling card function server 1001.

Said instruction 1 is determined by said first session initiation protocol phone 1200 for example from input that is entered into a user interface of said first session initiation protocol phone 1200.

Said first session initiation protocol phone 1200 sends said instruction 1 for example when said first session initiation protocol phone 1200 determines that a first user wants to access said telecommunications network 1000.

Methods for accessing telecommunications networks are well known to a person skilled in the art and not explained here.

In response to receiving said instruction 1 said call session control server 1002 determines said third identifier included in said instruction 1.

In case said third identifier was determined, said call session control function server 1002 sends an instruction 2, Request, including said second identifier, to said calling card function server 1001.

According to said first example, said instruction 2 is a session initiation protocol message 2, INVITE, including said first real time transport protocol address of said first session initiation protocol phone 1200.

In case said third identifier does not identify a calling card function operator, said first method is not started and normal package switched call session control is performed. Said normal package switched call session control is well known to a person skilled in the art and not further explained here.

In response to receiving said instruction 2, said calling card function server 1001 sends an instruction 3, Request, to said media resource function server 1004.

Said instruction 3 includes said second identifier. Additionally said instruction 3 includes a first set of instructions.

Said first set of instructions contains information about prompts to be played and information to be collected by said media resource function server 1004.

Said first set of instruction contains for example a calling card service greeting announcement, a prompt to the end user to input said calling card number, a prompt to the end user to input said personal identification number.

According to said first example, said instruction 3 is a session initiation protocol based media server control mark-up language message 3 containing said first real time transport protocol address and a first media server control mark-up language instruction (well known as MSCML instruction)

In response to receiving said instruction 3 said media resource function server 1004 sends an instruction 4, Response, to said calling card function server 1001. Said instruction 4 indicates whether said media resource function server 1004 accepts said first set of instructions or not.

In case said media resource function server 1004 accepts said first set of instructions said instruction 4 contains a fourth identifier, identifying said media resource function server 1004.

According to said first example said instruction 4 is a session initiation protocol response 200 "OK" including a second real time transport protocol address of said media resource function server 1004.

In case said media resource function server 1004 does not accept said first set of instructions, instruction 4 contains a first error message.

According to said first example said message 4 is a session initiation protocol response 418 "temporarily unavailable", indicating that said first media server control mark-up language instruction cannot be accepted.

In response to receiving said instruction 4 said calling card function server 1001 sends an instruction 5, Response, to said call session control function server 1002.

In case instruction 4 indicates that the media resource function server 1004 is able to accept said first set of instructions, said instruction 4 is forwarded as said instruction 5.

In this case, according to said first example, said message 4 is forwarded as a session initiation protocol message 5.

Otherwise said instruction 5 contains a second error message. Said second error message is determined by said calling card function server. Said second error message indicates that said calling card can not be used at this time.

In said first example, said second error message included in said message 5 is, for example 486 "busy here", indicating that said calling card can not be used at this time.

In response to receiving said instruction 5, said call session control function server 1002 forwards said instruction 5 as an instruction 6, Response, to said first session initiation protocol phone 1200. In case said instruction 6 contains said second error message, the first method ends. Otherwise said call session control function server 1002 waits for a reply to said message 6.

According to said first example, said message 5 is forwarded as a session initiation protocol message 6.

In case said call session control function server 1002 receives an instruction 7, Response, from said first session initiation protocol phone 1200, said call session control function server 1002 forwards said instruction 7 as an instruction 8, Response, to said call function control server 1001.

According to said first example, said instruction 7 and said instruction 8 are a session initiation protocol message 7 ACK and a session initiation protocol message 7 ACK.

To send said instruction 7 said first session initiation protocol phone 1200 may be adapted to determine if said instruction 6 contains said second error message upon receipt of said instruction 6.

Additionally said first session initiation protocol phone 1200 may be adapted to send said message 7 to said call session control server 1002 only in case said message 6 does not contain said second error message.

Additionally said first session initiation protocol phone 1200 may be adapted to display said second error message, for example on a graphical user interface build into said first session initiation protocol phone 1200, in case said instruction 6 contains said second error message.

According to said first example, said first session initiation protocol phone 1200 may be adapted to send said instruction 7 as a session initiation protocol message 7 or sound a "busy" sign upon receipt of said second error message.

Said instructions 4 to 7 are optional for the case in which said media resource function server 1004 does not accept said first set of instructions.

In response to receiving said instruction 8, said call session control function server 1001 forwards said instruction 8, as an instruction 9, Response, to said media resource function server 1004.

According to said first example, said instruction 9 is session initiation protocol message 9, ACK.

In case no reply to said instruction 5 is received within a first predetermined time period, said calling card function server 1001 informs said media resource function server 1004 that no connection to said first session initiation protocol phone 1200 can be established and said first method ends.

Messaging to inform said media resource function server 1004 is for example done using said session initiation protocol.

In response to receiving said instruction 9 a first connection between said first session initiation protocol phone 1200 and said media resource function server 1004 is established. Said first connection is established using said second identifier and said fourth identifier.

According to said first example, said first connection is established via a first real time transport protocol using said first and second real time transport protocol address of said first session initiation protocol phone 1200 and said media resource function server 1004.

During a session 10 that starts after said first connection is established, said media resource function server plays, i.e.

sends, a first announcement according to said first set of instructions received from said calling card function server 1001.

According to said first example said first announcement contains a Greeting message and a request for said calling card number and said personal identification number. Said first announcement is sent to said first session initiation protocol phone 1200 using said first real time transport protocol link.

Additionally said media resource function server 1004 is adapted to collect, i.e. receive, a first piece of information from said first session initiation protocol phone 1200 according to said first set of instructions.

Said first piece of information is for example a string including said calling card number and said personal identification number.

Methods for determining pieces of information, like said first piece of information, from voice input, multi tone input or the like, are known to a person skilled in the art for example from interactive voice response systems and are not further explained here.

According to said first example, said first set of information are first digits. Such digits are well known to a person skilled in the art from said media server control mark-up language.

After said media resource function server 1004 collected, i.e. received, said first piece of information or if a first timer timed out, an instruction 11, Information, is send from said media resource function server 1004 to said calling card function server 1001.

For example said calling card number and said personal identification number are returned in instruction 11.

Otherwise, i.e. in case no information was collected, i.e. determined, during said session 10 or if said first timer times out, for example an empty string is returned in instruction 11. Any other indicator of the failure to collect information, like a numeric code, might be used as well.

According to said first example, said instruction 11 is a media server control mark-up language message 11, including said first digits in case said first piece of information was collected, or an empty string otherwise.

In response to receiving said instruction 11, said calling card function server 1001 sends an instruction 12, Response, to said media resource function server 1004. Said instruction 12 is optional.

According to said first example said instruction 12 is a session initiation protocol message 12 "OK" indicating the save receive of said message 11.

In response to receiving said instruction 11 said calling card function server 1001 determines whether said instruction 11 contains said empty string.

In case said instruction 11 contains said empty string, said first session initiation protocol phone 1200 is disconnected from said calling card function server 1001. Afterwards said first method ends.

According to said first example, said first session initiation protocol phone 1200 is disconnected according to well known session initiation protocol disconnect routine if said message 11 contains an empty string. Afterwards said first method ends.

Otherwise an instruction 13, Request, is sent by said calling card function server 1001 to said online charging system 1003, to request validation of said calling card for example using said calling card number and said personal identification number.

According to said first example, said instruction 13 is a session initiation protocol based Mr message 13, requesting the validation of said calling card number using said personal identification number.

In response to receiving said instruction 13 said online charging system 1003 sends an instruction 14 to said calling card function server 1001.

Said instruction 14 indicates the result of an authentication of said calling card number using said personal identification number.

Methods for authenticating said calling card using said first identifier and said personal identification number are well known to persons skilled in the art and are not further explained here.

According to said first example, said instruction 14 is a session initiation protocol based Mr message 14, containing a string "valid" in case said calling card number is valid. Otherwise said message 14 contains a string "invalid".

In response to receiving said instruction 14 said calling card function server 1001 sends an instruction 15, Request, including a second set of instructions to said media resource function server 1004. Said second set of instructions contains a second announcement.

According to said first example, said instruction 15 is a media server control mark-up language message 15, containing said second announcement. Said second announcement contains a user menu to and requests pick a menu item.

Said user menu for example contains menu items like
balance query
change of personal identification number.

In response to receiving said instruction 15 said media resource function server 1004 may send an instruction 16, Response, to said calling card function server 1001. Said instruction 16 is optional.

According to said first example, said instruction 16 is a session initiation protocol message 16, "OK".

In response to receiving said instruction 15, in a session 17, said media resource function server 1004 plays said second announcement to said first session initiation protocol phone 1200. Said second announcement is played according to said second set of instructions. Said session 17 is established via said first connection using said first identifier and said second identifier.

According to said first example, in said session 17, said announcement is sent via said first real time transport protocol using said session initiation protocol descriptions.

Additionally a second piece of information is determined according to said second set of instructions.

According to said first example said second set of instructions are second digits that are collected from said first session initiation protocol phone 1200. As second digits a string "balance query" from a voice input of said first user in said first session initiation protocol phone 1200 is collected. Said string "balance query" for example indicates that said user requests a current balance of said calling card account.

Alternatively other operations may like changing the personal identification number be requested.

As soon as said second piece of information is available or if a second timer times out an instruction 18, Information, is send from said media resource function server 1004 to said calling card function server 1001. Said instruction 18 contains said second piece of information.

Otherwise, i.e. in case no information was collected during said session 17 or if said second timer times out, for example an empty string is returned in instruction 18. Any other indicator of the failure to collect information, like a numeric code, might be used as well.

According to said first example, said instruction 18 is a media server control mark-up language message 18, including said second digits, e.g. the string "balance query", in case said second piece of information was collected, or an empty string otherwise.

In response to receiving said instruction 18, said calling card function server 1001 sends an instruction 19 to said media resource function server 1004 to confirm the safe receipt of said instruction 18. Said instruction 19 is optional.

According to said first example said instruction 19 is a session initiation protocol message 19, "OK".

In response to receiving said instruction 18 said calling card function server 1001 determines whether said instruction 18 contains an empty string or not.

In case said instruction 18 contains an empty string said first session initiation protocol phone 1200 is disconnected from said calling card function server. Afterwards said first method ends.

According to said first example, said first session initiation protocol phone 1200 is disconnected according to well known session initiation protocol disconnect routine if said message 18 contains an empty string. Afterwards said first method ends.

Otherwise an instruction 20 is determined depending on the second piece of information included in said instruction 18. Said instruction 20 contains for example said string "balance query", said calling card account number and said calling card number.

According to said first example said instruction 20 is an internet protocol multimedia subsystem online charging interface message 20 containing said string "balance query", said calling card account number and said calling card number.

In response to receiving instruction 20 the online charging system 1003 sends an instruction 21, Response, to said calling card function server 1001. Said instruction 21 is determined depending on the content of said instruction 20.

In case information, like said current balance was requested from the online charging system 1003 by said instruction 20, said instruction 21 contains the requested information.

According to said first example said current balance of said calling card account is requested in message 20. In this case said message 21 contains for example a reply string including the available balance in said calling card account, e.g. in minutes.

In case said message 20 requests an operation on said calling card account like changing the personal identification number, said message 21 contains the result of said operation.

For example said message 21 is a session initiation protocol message 200 OK in case said personal identification number was changed successfully. In this case said message 21 is sent via said third packet switched link 1107.

In response to message 21 said calling card function server 1001 sends an instruction 22, Request, to said media resource function server 1004, requesting to play a third announcement.

According to said first example, said message 22 is a third set of instructions a media server control mark-up language message 22, containing said available balance received in said message 21.

In response to receiving said instruction 21 said media resource function server 1004 sends an instruction 23, Response, to said calling card function server 1001.

Said message 23 is for example a session initiation protocol message 200 OK. Said message 23 is optional.

Additionally in response to receiving message 22 the media resource function server 1004 plays a third announcement according to said third set of instructions.

Said third announcement is played, i.e. sent, to said first session initiation protocol phone 1200, in a session 24 using said first connection, for example said first real time transport protocol link between said media resource function server 1004 and said first session initiation protocol phone 1200.

Additionally said third announcement may include another prompt to request whether said first user of said first session initiation protocol 1200 wants to perform further actions during the current session.

After said session 24 ended, i.e. after said third announcement was sent said third piece of information were received, or a third timer timed out, an instruction 25, Information, is send from said media resource function server 1004 to said calling card function server 1001.

Said message 25 contains information about the result of said session 24 or a third piece of information.

According to said first example, said third piece of information are third digits, collected, i.e. received, during said session 24.

The steps of menu playing and collecting user selections may be repeated as well as the steps of taking actions to modify or change for example the user profile of said first user on said online charging system 1003.

Whenever said call session control function server 1002 receives an instruction 26, Request, requesting the termination of said first connection, said call session control function server 1002 forwards said message 26 as an instruction 27, Request, to said calling card function server 1001.

According to said first example, said instruction 26 and said instruction 27 are is session initiation protocol messages 26, "BYE" and session initiation protocol messages 27, "BYE" respectively.

To send said instruction 26 said first session initiation protocol phone 1200 may be adapted to determine the disconnection wish of said first user by monitoring input of said first user via said first user interface.

In response to receiving said instruction 27 said calling card function server 1001 forwards said instruction 27 as an instruction 28, Request, to said media resource function server 1004.

According to said first example said instruction 28 is a session initiation protocol message 28, "BYE".

In response to receiving said instruction 28 said media resource function server 1004 sends an instruction 29, Response, in order to confirm the disconnection, to said calling card function server 1001.

Upon receipt of said instruction 29 said calling card function server 1001 forwards said instruction 29 as an instruction 30, Response, to said call session control function server 1002.

Upon receipt of said message 30 said call session control function server 1002 forwards said message 30 as a message 31, Response, to said first session initiation protocol phone 1200.

According to said first example, said instruction 29, said instruction 30 and said instruction 31 is a session initiation protocol message 29, "OK", a session initiation protocol message 30, "OK" and a session initiation protocol message 31, "OK" respectively.

Upon receipt of said message 28 said first connection ends on said media resource function server 1004 in a session 32.

According to said first example said first real time transport protocol session is terminated.

Afterwards said first method ends.

Said first session initiation phone 1200 may be adapted to terminate said first connection in session 32 as well, when said message 31 was received.

The goal of a second method according to the invention is to connect said first session initiation protocol phone 1200 and said second session initiation protocol phone 1201 via a second connection.

Said second method and a second example of an implementation of said second method are described below referencing FIG. 3.

According to said second example said second connection is a second real time transport protocol link.

Instructions of said second method and messages of said second example that are equivalent to instructions from said first method and said first example respectively are labeled identically.

Said second method starts like said first method and comprises of the same steps as said first method until said instruction 18, i.e. in said first example said message 18, is to be determined.

Additionally to the menu items known from the user menu according to said first method, said user menu according to said second method contains an item "number to be called", that is announced to said first user during said session 17.

Said calling card function server 1001 is adapted to determine, whether said first piece of information received from said media resource function server 1004 contains said fifth identifier identifying said second session initiation protocol phone 1201 or not.

In said second example, said calling card function server 1001 is adapted to determine this from said first digits collected during said session 17.

In case said fifth identifier is included in said first piece of information, said instruction 18 is determined to contain said first piece of information.

According to said second example, said instruction 18 is determined as said media server control mark-up language message 18 containing for example a second phone number of said second session initiation protocol phone 1201 as first digits. Instead of said second phone number, any other identification of said second session initiation protocol phone 1201, like a symbol, could be used.

According to said second method, handling of errors and the sending of said instruction 19 is done in the same way as in said first method.

As in said first method, according to said second method said instruction 20 is sent from said calling card function server 1001 to said online charging system 1003.

However according to said second method said instruction 20 is modified to request a reservation of a call quota from said online charging system 1003 for said calling card.

Additionally said instruction 20 contains tariff information.

Said tariff information is determined by said calling card function server 1001 depending on for example said fifth identifier or said second identifier.

Said tariff information specifies an amount of said credit to be subtracted from said calling card account when making the reservation of said call quota. Methods to determine such tariffs are well known to a person skilled in the art and not explained here further.

Said tariff is for example read by said calling card function server 1001 from a non-volatile storage, like a hard disk, containing for example a mapping of time of the day or destination to a certain tariff.

In said second example said instruction 20 is a session initiation protocol based Mr message 20, containing a request for call quota as well as said tariff information.

In response to said instruction 20 said online charging system 1003 sends said instruction 21 to said calling card function server 1001.

Said instruction 21 according to said second method is modified to include the result of said request for call quota.

Said instruction 21 is determined by said online charging system 1003 by methods known to persons skilled in the art for charging online calling card account.

In said second example said instruction 21 is a session initiation protocol based Mr message 21 including a granted call quota. Said granted call quota is for example a granted service unit (well known as GSU) or available call duration in minutes.

An instruction 22 is sent from said calling card function server 1001 to said media resource function server 1004 when said instruction 21 is received by said calling card function server 1001.

Said instruction 22 according to said second method is determined by said calling card function and comprises a fourth set of instruction to request a fourth announcement to be played by said media resource function server 1004 to said first session initiation protocol phone 1200.

According to said second example said instruction 22 is a media server control mark-up language request to play the available call duration received in message 21.

Said instruction 23 is sent from said media resource function server 1004 to said calling card function server 1001 in response to receiving said instruction 22. Said instruction 23 indicates that said media resource function server 1004 is available to play said fourth announcement.

According to said second example, said instruction 23 is a session initiation protocol message 23, "OK".

The case that said media resource function server 1004 is not able to accept said forth set of instructions is handled equivalently to the corresponding case in said first method and said first example.

In session 24 according to said second method said fourth announcement is played to inform said first user of said first session initiation protocol phone 1200 about for example said available call duration.

After said session 24 ended, said instruction 25 is sent from said media resource function server 1004 to said calling card function server 1001 reporting the result of said session 24.

According to said second example said instruction 25 is a media server control mark-up language message 25 indicating the final status code, for example success or error, of said session 24.

Sending instructions and messages 22, 23 and 25 as well as session 24 are optional.

Figure 3:
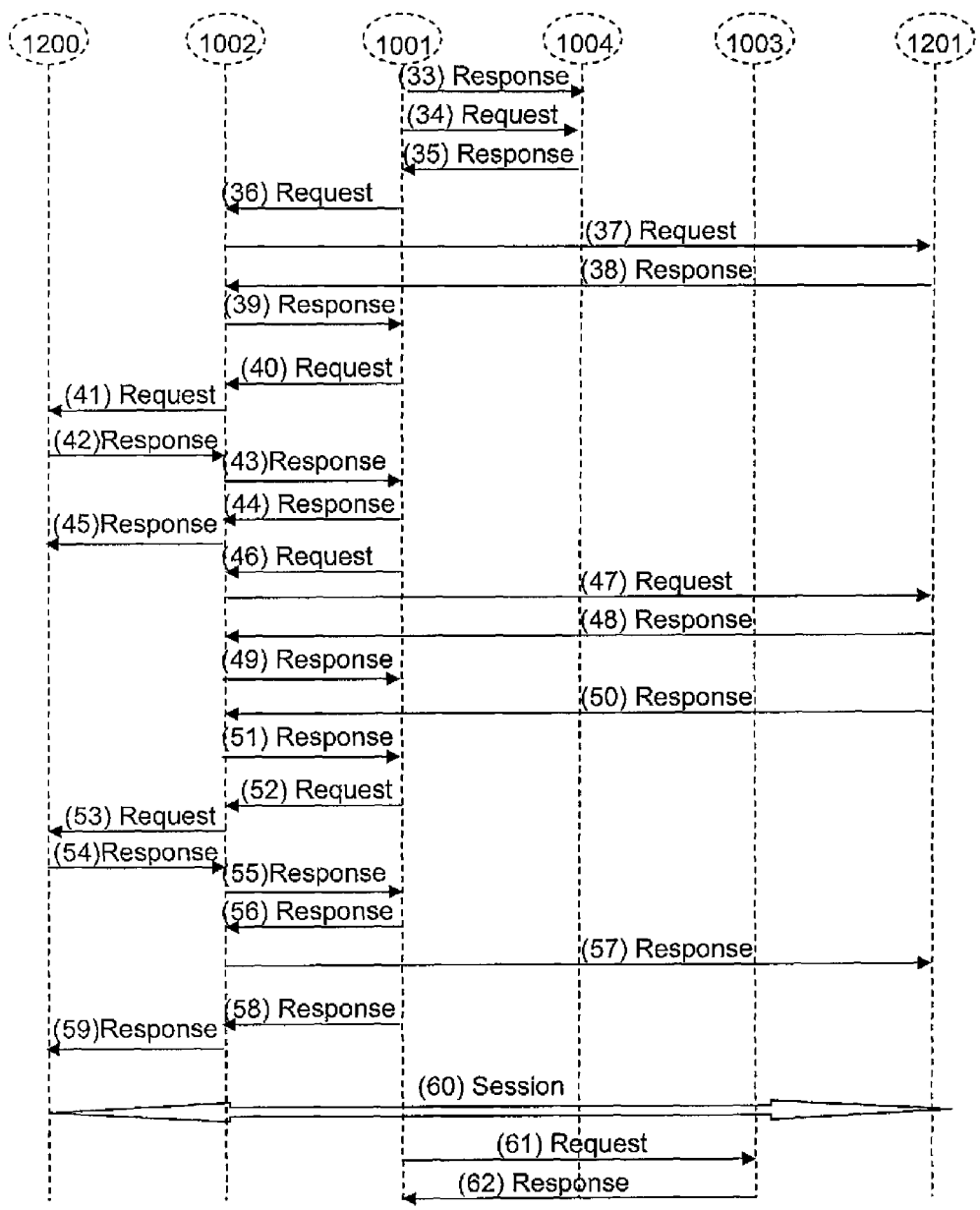
FIG. 3 schematically shows a second sequence diagram, showing some typical sequences in a second method according to the invention.

Additional steps according to said second method replacing said instructions and messages 26 to 32 of said first method and said first example respectively, are now described making reference to FIG. 3.

An instruction 33 is sent from said calling card function server 1001 to said media resource function server 1004 in response to receiving said instruction 25. Sending instruction 33 is optional.

According to said second example said instruction 33 is a session initiation protocol message 33, "OK".

Additionally upon receipt of said instruction 25, an instruction 34, Request, is sent by said calling card function server 1001 to said media resource function server 1004, in order to request disconnection of said first connection.

According to said second example said instruction 34 is a session initiation protocol message 34, "BYE" to request disconnection of said first connection between said session initiation protocol phone 1200 and said media resource function server 1004.

In response to receiving said instruction 34 said media resource function server 1004 sends an instruction 35, Response, to confirm the disconnection of said first connection.

According to said second example said instruction 35 is a session initiation protocol message 35, "OK", to confirm the disconnection of said first connection.

Said instructions and messages 34 and 35 are optional, e.g. in case said media resource function server 1004 and said first session initiation protocol phone 1200 support for example multiple connections, i.e. real time transfer protocol links, in parallel.

Said calling card function server 1001 sends an instruction 36, Request, to said call session control function server 1002. Said instruction 36 is sent upon receipt of said instruction 21, or optionally after receiving said instruction 25. Said instruction 36 includes said second identifier.

According to said second example said instruction 36 is a session initiation protocol message 36, "INVITE". Said message 36 includes said first session description protocol description of said first session initiation protocol phone 1200, including said first real time transport protocol address.

Upon receipt of said instruction 36, said call session control function server 1002 forwards said instruction 36 as an instruction 37, Request, to said second session initiation protocol phone 1201.

According to said second example said instruction 37 is a session initiation protocol message 37, "INVITE". Said message 37 includes said first session description protocol description of said first session initiation protocol phone 1200, including said first real time transport protocol address.

In case no call can be made, i.e. no credit is left on said calling card account, said instruction 36 is not sent to said second session initiation protocol phone 1201. Instead said instruction 36 is sent to said first session initiation protocol phone 1200 to indicate that no call can be made. Said instruction 36 is sent in this case via said call session control function server 1002.

In the second example said message 36 is sent via said call session control function server 1002 to said second session initiation protocol phone 1201 in case said granted service unit, e.g. said available call duration is larger than Zero, or optionally in case said message 25 indicates success.

Otherwise, i.e. if no call can be made, said message 36 is not sent via said call session control function server 1002 to said second session initiation protocol phone 1201. Instead said message 36 is sent via said call session control function server 1002 as a session initiation protocol message "BYE" to said first session initiation protocol phone 1200 to indicate that no call can be made. Afterwards the first connection between said first session initiation protocol phone 1200 and said media resource function server 1004 is terminated by said media resource function server 1004, for example according to standard session initiation protocol disconnection procedure, and said second method ends.

Optionally said call session control function server 1002 may be adapted to receive an instruction 38, Response, for example a provisional response, which is sent from said second session initiation protocol phone 1201 in response to receiving said message 37. Said call session control function server 1002 may be adapted to forward said instruction 38 as an instruction 39, Response, to said calling card function server 1001 upon receipt of said instruction 38.

According to said second example said instruction 38 and said instruction 39 is a session initiation protocol message 38 "session progress" and a session initiation protocol message 39 "session progress" respectively.

In case said optional instruction 38 is used but no reply to said instruction 36 is received by said calling card function server 1001 within a second predetermined time period, said calling card function server 1001 informs said first session initiation protocol phone 1200 that no connection to said second session initiation protocol phone 1201 can be established and said second method ends.

According to said second example, messaging to inform said first session initiation protocol phone 1200 is done using said session initiation protocol.

In case said instruction 36 was sent to said second session initiation protocol phone 1201 as said instruction 37 via said call session control function server 1002, said calling card function server 1001 also sends an instruction 40, Request, to the call session control function server 1002 including an invitation for said first session initiation protocol phone 1200 to connect to the second session initiation protocol phone 1201.

According to said second example said instruction 40 is a session initiation protocol message 40, "INVITE".

Upon receiving said instruction 40 said call session control function server 1002 forwards said instruction 40 as an instruction 41, Request, to said first session initiation protocol phone 1200.

According to said second example said instruction 41 is a session initiation protocol message 41, "INVITE".

Upon receipt of an instruction 42, Response, from said first session initiation phone 1200, said call session control function server 1002 forwards said instruction 42 as an instruction 43, Response, to said calling card function server 1001.

According to said second example said instruction 42 is a session initiation protocol message 42, "OK", including said session description parameters according to said session description protocol of said first session initiation protocol phone 1200.

Said first session initiation protocol phone 1200 may be adapted to send said instruction 42 in response to receiving said instruction 41.

In response to receiving said instruction 43 said calling card function server 1001 sends an instruction 44, Response, to said call session control function server 1002.

According to said second example said instruction 44 is a session initiation protocol message 44, "ACK".

In case no reply to instruction 40 was received within a third predetermined time period, said calling card function server 1001 informs said media resource function server 1004 that no connection to said first session initiation protocol phone 1200 can be established and said second method ends.

According to said second example messaging to inform said media resource function server 1004 is done using said session initiation protocol.

Upon receipt of said instruction 44 said call session control function server 1002 forwards said instruction 44 as an instruction 45, Response, to said first session initiation protocol phone 1200.

According to said second example said instruction 45 is a session initiation protocol message 45, "ACK".

Optionally a provisional acknowledgement is sent from said calling card function server 1001 to said call session control function server 1002 in an instruction 46, Request, upon receipt of said instruction 43.

Upon receipt of said instruction 46 said call session control function server 1002 forwards said instruction 46 as an instruction 47, Request, to said second session initiation protocol phone 1201.

According to said second example said instruction 46 and said instruction 47 is a session initiation protocol message 46 "PRACK" and a message 47 "PRACK" respectively.

Optionally said call session control function server 1002 may be adapted to receive an instruction 48, Response, indicating the safe receipt of said instruction 47 by said second session initiation protocol phone 1201. In this case said call session control function server 1002 may be adapted to forward said instruction 48 as an instruction 49, Response, to said calling card function server 1001.

Upon receipt of an instruction 50, Response, from said second session initiation protocol phone 1201 said call session control function server 1002, forwards said instruction 50 to said calling card function server 1001 as an instruction 51, Response.

Upon receipt of said instruction 51, said calling card function server 1001 determines and sends an instruction 52, Request, including said fifth identifier of said second session initiation protocol phone 1201, to said call session control function server 1002.

According to said second example said instruction 51 is a session initiation protocol message 51, "OK", including session description protocol parameters of said second session initiation protocol phone 1201. For example said message 51 includes a third real time transport protocol address of said second session initiation protocol phone 1201. Said message 51 may include additional parameters, for example codex parameters indicating the available codex on said second session initiation protocol phone 1201 according to said session description protocol.

According to said second example said instruction 52 is a session initiation protocol message 52, "INVITE" including said session description protocol parameters and said third real time transport protocol address of said second session initiation protocol phone 1201

In case no reply to instruction 36 or instruction 46 was received within a fourth predetermined time period, said calling card function server 1001 informs said first session initiation protocol phone 1200 that no connection to said second session initiation protocol phone 1201 can be established and said second method ends.

According to said second example messaging to inform said first session initiation protocol phone 1200 is done via said call session control function server 1002 using said session initiation protocol.

Said second session initiation protocol phone 1201 may be adapted to send said instruction 48, in said second example said session initiation protocol message 48, "OK", in response to the receipt of said instruction 47 and message 47 respectively.

Additionally said second session initiation protocol phone 1201 may be adapted to notify its environment about the invitation, i.e. upon receipt of said instruction 36 or said instruction 46.

According to said second example said second session initiation protocol phone 1201 comprises a human machine interface, like a loudspeaker, that informs the environment about the invitation upon receipt of said message 36.

Furthermore said second session initiation protocol phone 1201 may be adapted to send said instruction 47 in case said invitation shall be accepted.

In said second example, said message 47 is for example sent when said second session initiation protocol phone 1201 determines that a button on said second session initiation protocol phone 1201 has been pressed.

Upon receipt of said instruction 52 said call session control function server 1002 forwards said instruction 52 as an instruction 53, Request, to said first session initiation protocol phone 1200.

According to said second example, said instruction 53 is a session initiation protocol message 53, "INVITE", including said session description protocol parameters of said second session initiation protocol phone 1201. For example said message 53 includes said third real time transport protocol address of said second session initiation protocol phone 1201.

Said call session control function server 1002 is adapted to receive an instruction 54 and forward it as an instruction 55, Response, to said calling card function server 1001.

In case no reply to said instruction 52 is received within a fifth predetermined time period, said calling card function server 1001 informs said second session initiation protocol phone 1201 that no connection to said first session initiation protocol phone 1200 can be established and said second method ends.

According to said second example, messaging to inform said first session initiation protocol phone 1200 via said call session control function server 1002 is for example done using said session initiation protocol.

Said first session initiation protocol phone 1200 may be adapted to send an instruction 54, Response, to said call session control function server 1002, in response to receiving said instruction 53.

According to said second example, said instruction 54 is for example a session initiation protocol message 54, "OK".

Upon receipt of said instruction 55 said calling card function server 1001 sends an instruction 56, Response, to said call session control function server 1002.

According to said second example, said instruction 56 is a session initiation protocol message 56 "ACK".

Upon receipt of said instruction 56 said call session control function server 1002 sends an instruction 57, Response, to said second session initiation phone 1201.

According to said second example, said instruction 57 is a session initiation protocol message 57 "ACK".

Additionally in response to receiving said instruction 55, said calling card function server 1001 sends an instruction 58, Response, to said call session control function server 1002.

According to said second example, said instruction 58 is a session initiation protocol message 58 "ACK"

Upon receipt of said instruction 58 said call session control function server forwards said instruction 58 as instruction 59 to said first session initiation protocol phone 1200.

According to said second example, said instruction 59 is a session initiation protocol message 59 "ACK"

After said first session initiation protocol phone 1200 and said second session initiation protocol phone 1201 received said instruction 59 and said instruction 57 respectively said second connection is established.

According to said second example said second real time transport protocol link between said first session initiation protocol phone 1200 and said second session initiation protocol phone 1201 is established upon receipt of said message 59 and said message 57.

A session 60 that is using said second connection, is started as soon as said second connection is established.

For continuous charging of said calling card account, said calling card function server 1001 is adapted to monitor said second connection or said session 60.

In said second example, calling card function server 1001 starts an internal timer, for example initialized to Zero at the beginning of said second connection, to determine a connection time that said second connection is running.

In order to charge said calling card account, i.e. to request another call quota, said calling card function server 1001 sends an instruction 61, Request, to said online charging system 1003.

In said second example said instruction 61 is a session initiation protocol based Mr message 61. Said message 61 is sent every time said timer exceeds a first threshold, for example 1 minute.

After said message 61 was sent, said timer is reset to Zero, in order to start a new charging interval.

Alternatively or additionally other methods of determining the point in time for charging, like per unit charging, may be implemented as well.

In response to receiving said instruction 61 said online charging system 1003 sends an instruction 62, Response, indicating whether said session 60 may continue or not, to said calling card function server 1001.

According to said second example, said instruction 62 is a session initiation protocol based Mr message 62 indicating said granted service unit.

Said calling card function server 1001 is adapted to determine whether said session 60 is permitted to continue depending on said instruction 62.

According to said second example said calling card function server 1001 is adapted to end said session 60 in case no further granted service unit is available or received from said online charging system 1003.

In case said session 60 is to be ended, said calling card function server sends a termination instruction to said first session initiation protocol phone 1200 via said calling card function server 1001 and to said second session initiation protocol phone 1201 directly.

In said second example said calling card function server 1001 sends session initiation protocol messages "BYE" to both the first session initiation protocol phone 1200 and the second session initiation protocol phone 1201 via said call session control function server 1002. Further processing is done using standard session initiation protocol procedure for disconnecting.

Afterwards said second method ends.

Said instruction and messages 61 and 62 may be sent several times during a session 60.

The goal of a third method according to the invention is to play a mid-call announcement to said first session initiation protocol phone 1200.

Figure 4:
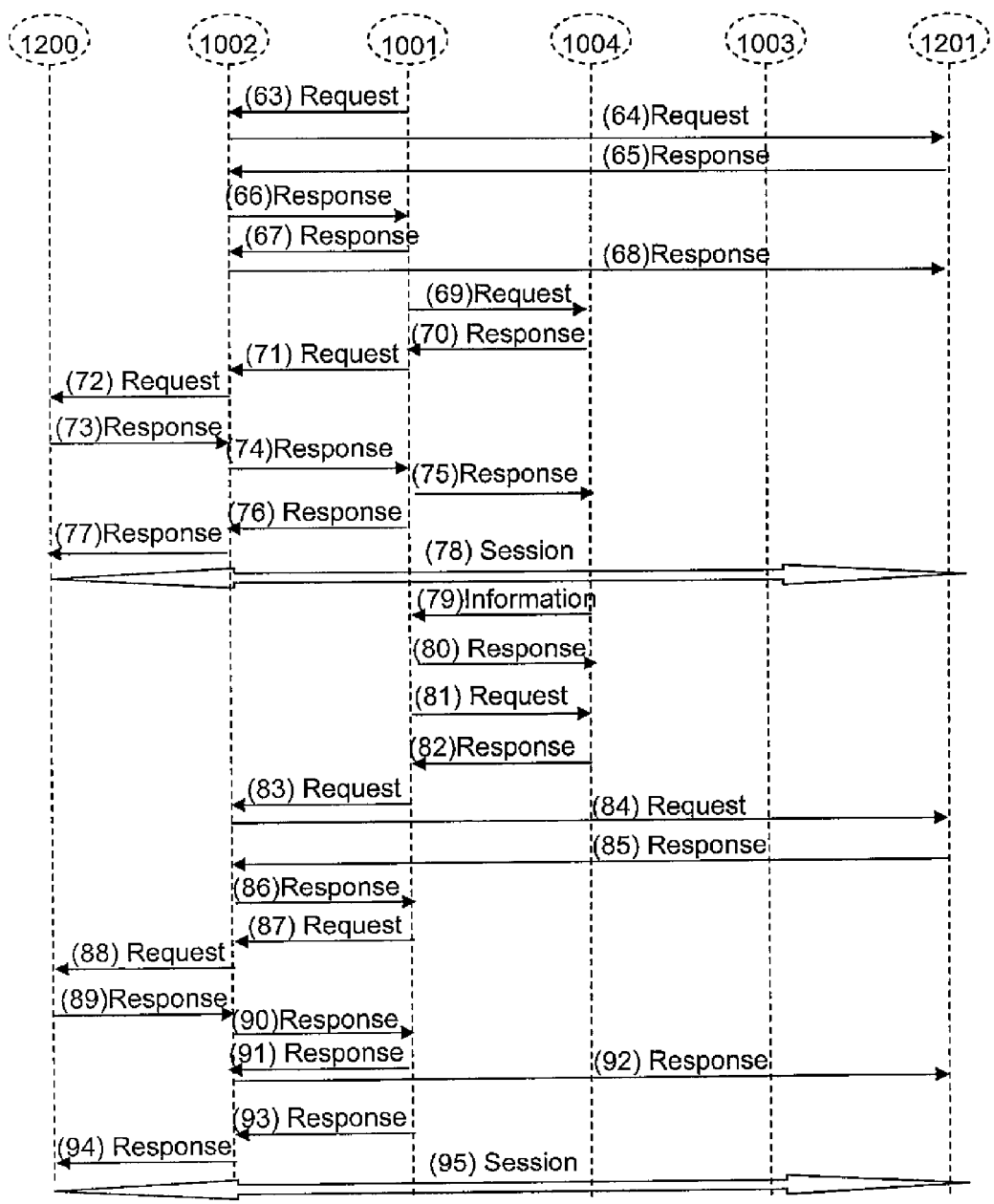
FIG. 4 schematically shows a third sequence diagram, showing some typical sequences in a third method according to the invention.

Said third method and a third example of an implementation of said third method are explained below making reference to FIG. 4. Said third method starts anytime that said calling card function server 1001 determines that a mid-call announcement needs to be played.

In said third example a mid-call announcement needs to be played in case said message 62 that is received in response to said request for call quota, e.g. the next granted service unit, indicates that a final unit has been reached.

In such case said second session initiation protocol phone 1201 will be put on hold and said mid-call announcement will be played to said first session initiation protocol phone 1200.

To that end said calling card function server 1001 sends an instruction 63, Request, to said call session control function server 1002.

Said instruction 63 is sent in case said calling card function server 1001 determines that a mid-call announcement needs to be played.

According to said third example, said instruction 63 is a session initiation protocol message 63, "INVITE" with the parameter "hold" that is sent, in case said message 62 indicates that said final unit has been reached.

Upon receipt of said instruction 63 or according to said third example, said message 63, said call session control function server 1002 forwards said instruction 63 and said message 63 as an instruction 64 and a message 64 to said second session initiation protocol phone 1201 respectively.

Said second session initiation protocol phone 1201 may be adapted to send an instruction 65, Response, to said call session control function server 1002 in response to receiving said instruction 64. Said instruction 65 is optional.

According to said third example, said instruction 65 is a session initiation protocol message 65, "OK".

Upon receipt of said instruction 65 or according to said third example, said message 65, said call session control function server 1002 forwards said instruction 65 and said message 65 as an instruction 66 and a message 66 to said calling card function server 1001 respectively.

In response to receiving said instruction 66, said calling card function server 1001 sends an instruction 67, Response, to said call session control function server 1002.

Upon receipt of said instruction 67 or said message 67, said call session control function server 1002 forwards said instruction 67 and said message 67 as an instruction 68 and an message 68 to said second session initiation protocol phone 1201 respectively.

Said instruction 67 and said instruction 67 is optional. According to said third example, said instruction 67 and said instruction 68 is a session initiation protocol message 67 "ACK" and a session initiation protocol message 68 "ACK" respectively.

When said instruction 63 was sent said calling card function server 1001 sends an instruction 69, Request, for example a fifth set of instructions to said media resource function server 1004.

According to said third example, said instruction 69 is a media server control mark-up language message 69 including a text of said mid-call announcement and said first real time transport protocol address of said first session initiation protocol phone 1200.

In response to receiving said instruction 69, said media resource function server 1004 sends an instruction 70, Response, including said first identifier of said media resource function server 1004, to said calling card function server 1001.

According to said third example said instruction 70 is a session initiation protocol message 70, "OK", including said second real time transport protocol address.

Upon receipt of said instruction 70 said calling card function server 1001 sends an instruction 71, Request, including said first identifier of said media resource function server 1004 and said second identifier of said first session initiation protocol phone 1200 to said call session control function server 1002.

According to said third example said instruction 71 is a session initiation protocol message 71, "INVITE".

Said call session control function server 1002 forwards said instruction 71 as an instruction 72, Request, to said first session initiation protocol phone 1200.

According to said third example said instruction 72 is a session initiation protocol message 72, "INVITE".

Said call session control function server 1002 is adapted to receive an instruction 73, Response from said first session initiation protocol phone 1200.

According to said third example, said instruction 73 is a session initiation protocol message 73, "OK".

Said first session initiation protocol phone 1200 may be adapted to send said instruction 73 to said call session control function server 1002 in response to receiving said instruction 73.

According to said third example said first session initiation protocol phone 1200 is adapted to send said message 73 in response to receiving said message 72.

Said call session control function server 1002 forwards said instruction 73 as an instruction 74, Response, to said calling card function server 1001.

According to said third example, said instruction 74 is a session initiation protocol message 74, "OK".

Upon receipt of said instruction 74, said calling card function server 1001 sends an instruction 75, Response, to said media resource function server 1004.

According to said third example, said instruction 75 is a session initiation protocol message 75, "ACK".

Additionally upon receipt of said instruction 74 said calling card function server 1001 sends an instruction 76, Response, to said call session control function server 1002.

According to said third example, said instruction 76 is a session initiation protocol message 76, "ACK".

Said call session control function server 1002 forwards said instruction 76 as an instruction 77, Response, to said first session initiation protocol phone 1200.

According to said third example, said instruction 77 is a session initiation protocol message 77, "ACK".

A third connection is established between said first session initiation protocol phone 1200 and said media resource function server 1004 upon receipt of said instruction 75 and said instruction 77 by said media resource function server 1004 and said first session initiation protocol phone 1200 respectively. Said second connection is therefore put on hold.

According to said third example said third connection is a third real time transport protocol link.

A session 78 is started as said third connection is established.

According to said third example, said session 78 is started as soon as said third real time transport protocol link is available.

During said session 78 said media resource function server 1004 plays said mid-call announcement according to said fifth set of instructions.

According to said third example, said mid-call announcement indicates that the final unit on said calling card account is to be used. To set up said session 78, said message 73, said message 74 and said message 75 as well as said message 76 and message 77 may include for example session description protocol descriptions of said first session initiation protocol phone 1200 and said media resource function server 1004 respectively.

Error handling, for example if the media resource function server cannot accept said fifth set of instructions, is done in the same way as described in said first method.

After session 78 ends said media resource function server 1004 sends an instruction 79, Information, indicating the final status, e.g. success or error, of said session 78 to said calling card function server 1001.

According to said third example, said instruction 79 is a media server control mark-up language message 79, indicating success or error.

Said instruction 79 and said message 79 are determined by said media resource function server 1004 in the same way as described above for said instruction 11 or said message 11 respectively.

In response to receiving said instruction 79, said calling card function control server 1001 sends an instruction 80, Response, to said media resource function server 1004. Said instruction 80 is optional.

According to said third example, said instruction 80 is a session initiation protocol message 80, "OK".

Upon receipt of said instruction 79, said calling card function server 1001 sends an instruction 81, Request, to said media resource function server 1004 in order to disconnect from said media resource function server 1004.

According to said third example, said instruction 81 is a session initiation protocol message 81, "BYE".

In response to receiving said instruction 81, said media resource function server 1004 sends an instruction 82, Response, to confirm the disconnection of said media resource function server 1004. Said instruction 82 is optional.

According to said third example, said instruction 82 is a session initiation protocol message 82, "OK".

Upon receipt of said instruction 82 or after sending said instruction 81, said calling card function server 1001 sends an instruction 83, Request, to said call session control function server 1002.

According to said third example, said instruction 83 is a session initiation protocol message 83, "INVITE", in particular a re-invite without said session description protocol description of said first session initiation protocol phone 1200.

However said message 83 may include said session description protocol description of said first session initiation protocol phone 1200.

Upon receipt of said instruction 83 or said message 83, said call session control function server 1002 forwards said instruction 83 or said message 83 as an instruction 84 and a message 84 to said second session initiation protocol phone 1201 respectively.

Said call session control function server 1002 is adapted to receive an instruction 84, Response, from said second session initiation protocol phone 1201. Said instruction 84 may include, said fifth identifier of said second session initiation protocol phone 1201.

Said call session control function server 1002 is adapted to forward said instruction 84 as an instruction 85 to said calling card function server 1001 upon receipt of said instruction 84.

Said second session initiation protocol phone 1201 may be adapted to send said instruction 85 in response to receiving said instruction 85.

According to said third example, said instruction 85 is a session initiation protocol message 85, "OK" that is sent by said second session initiation protocol phone 1201 in response to receiving said message 84. Additionally said message 85 may include said session description protocol description of said second session initiation protocol phone 1201.

According to said third example, said instruction 86 is a session initiation protocol message 86, "OK".

Upon receiving said instruction 86, said calling card function server 1001 sends an instruction 87, Request, including said fifth identifier of said second session initiation protocol phone 1201 to said call session control function server 1002.

According to said third example, said instruction 87 is a session initiation protocol message 87, "INVITE", including said fifth identifier of said second session initiation protocol phone 1201.

Additionally said message 87 may include said session description protocol parameter of said second session initiation protocol phone 1201.

Alternatively said message 87 is a re-invite message without said session initiation protocol parameters of said second session initiation protocol phone 1201.

Upon receipt of said instruction 87, said call session control function server 1002 forwards said instruction 87 as an instruction 88, Response, to said first session initiation protocol phone 1200.

According to said third example, said instruction 88 is a session initiation protocol message 88, "INVITE", including said fifth identifier of said second session initiation protocol phone 1201.

Said call session control function server 1002 is adapted to receive an instruction 89, Response, including said second identifier of said first session initiation protocol phone 1200, from said first session initiation protocol phone 1200.

Said first session initiation protocol phone 1200 may be adapted to send said instruction 89 in response to receiving said instruction 88.

According to said third example, said instruction 89 is a session initiation protocol message 89, "OK", including said second identifier of said first session initiation protocol phone 1200. Said message 89 is sent from said first session initiation protocol phone 1200 upon receipt of said message 88.

Additionally said message 89 may include said session description protocol parameters of said first session initiation protocol phone 1200.

Upon receipt of said instruction 89, said call session control function server 1002 forwards said instruction 89 as an instruction 90, Response, to said calling card function server 1001.

According to said third example, said instruction 90 is a session initiation protocol message 90, "OK", including said second identifier of said first session initiation protocol phone 1200.

Upon receipt of said instruction 90, said calling card function server 1001 sends an instruction 91, Response, including said second identifier of said first session initiation protocol phone 1200 to said call session control function server 1002.

Upon receipt of said instruction 91, said call session control function server 1002 forwards said instruction 91 as an instruction 92, Response, to said second session initiation protocol phone 1201.

According to said third example, said instruction 91 is a session initiation protocol message 91, "ACK", including said second identifier of said first session initiation protocol phone 1200

Additionally said message 91 may include said session description parameters of said first session initiation protocol phone 1200.

According to said third example, said instruction 92 is a session initiation protocol message 92, "ACK", including said second identifier of said first session initiation protocol phone 1200.

Additionally said message 92 may include said session description parameters of said first session initiation protocol phone 1200.

Upon receipt of said instruction 90, said calling card function server 1001 sends a message 93, Response, to said call session control function server 1002.

According to said third example, said instruction 93 is a session initiation protocol message 93 "ACK".

Upon receipt of said instruction 93, said call session control function server 1002 forwards said instruction 93 as an instruction 94 to said first session initiation protocol phone 1200.

According to said third example, said instruction 94 is a session initiation protocol message 94 "ACK".

Said second connection is re-established upon receipt of said instruction 94 and said instruction 92 by said first session initiation protocol phone 1200 and said second session initiation protocol phone 1201 respectively.

As soon as said second connection is re-established, a session 95 is established, According to said third example, said second connection is re-established via said second real time transport protocol link, upon receipt of said message 94 and said message 92, using said session initiation protocol descriptions.

Afterwards said third method ends and said session 95 may be continued according to said second method.

In case any of the aforementioned instructions or messages that are, according to said third method, expected to be received from said first session initiation protocol phone 1200 or said second session initiation protocol phone 1201 are not received by said call session control function server 1002 and said calling card function server 1001 respectively, error handling is performed, e.g. the active connection is terminated, as described before in said first or second method.

Additionally to all of the before mentioned methods said calling card function server 1001 maybe adapted to handle the termination of any of said second connection between said first session initiation protocol phone 1200 and said second session initiation protocol phone 1201.

Figure 5:
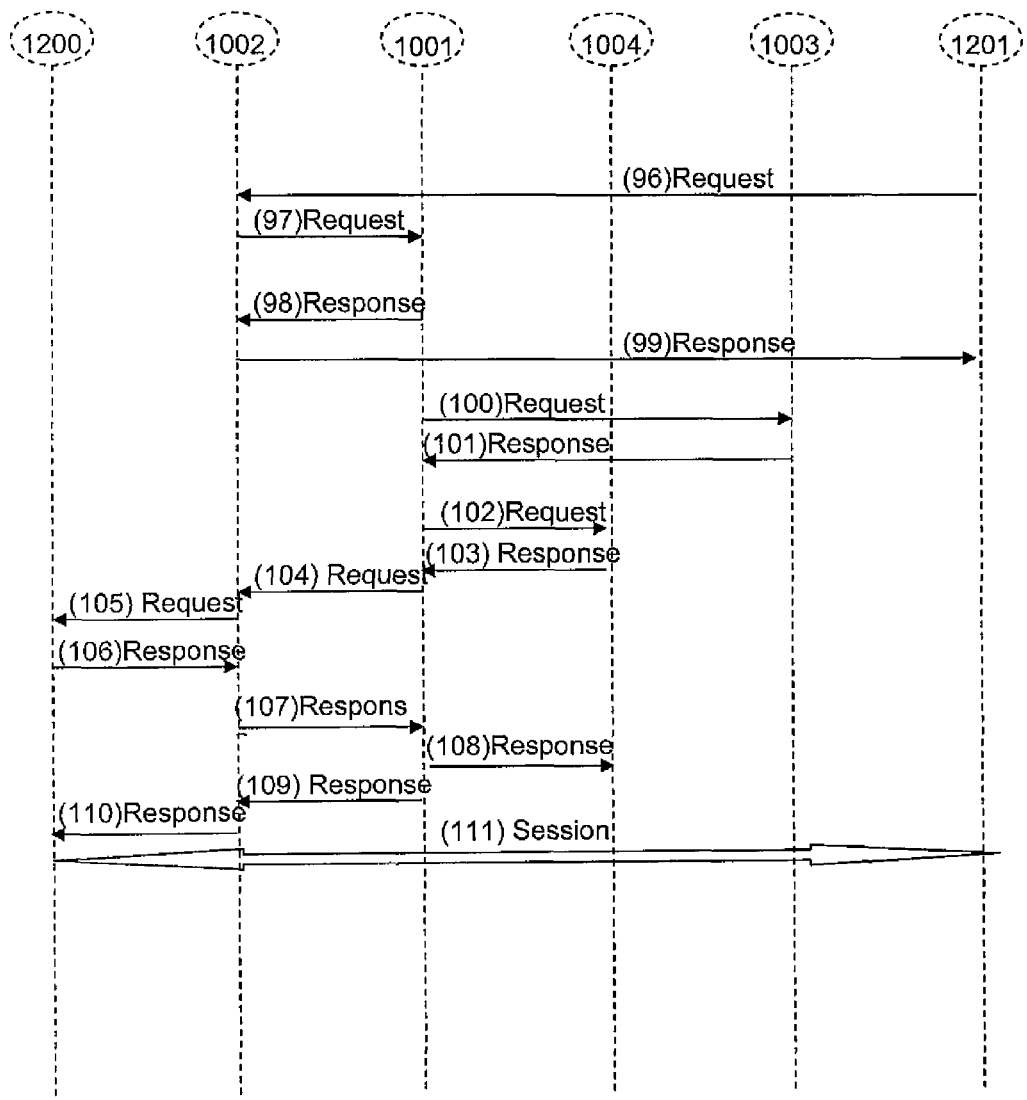
FIG. 5 schematically shows a fourth sequence diagram, showing some typical sequences in a fourth method according to the invention.

A fourth method and a fourth example of an implementation of said fourth method, providing this functionality are explained referencing FIG. 5.

The fourth method starts, whenever said call session control function server 1002 receives an instruction 96, Request, from said second session initiation protocol phone 1201, requesting to terminate said second connection.

According to said fourth example, said instruction 96 is a session initiation protocol message 96, "BYE".

Said second session initiation protocol phone 1201 may be adapted to detect that a second user of said second session initiation protocol phone 1201 wants to terminate said connection. According to said fourth example, said second session initiation protocol phone 1201 determines that a button on said second session initiation protocol phone 1201 was pressed. In this case said second session initiation protocol phone 1201 sends said message 96.

Upon receipt of said instruction 96 or said message 96, said call session control function server 1002 forwards said instruction 96 and said message 96 as an instruction 97, Response, and a message 96 to said calling card function server 1001 respectively.

According to said fourth example, said instruction 97 is a session initiation protocol message 97, "BYE".

In response to receiving said instruction 97 said calling card function server 1001 sends an instruction 98, Response, indicating the receipt of said instruction 97, to said call session control function server 1002.

According to said fourth example, said instruction 98 is a session initiation protocol message 98, "OK".

Upon receipt of said instruction 98 or said message 98 said call session control function server 1002 forwards said instruction 98 and said message 98 as an instruction 99, Response, and a message 99, to said second session initiation protocol phone 1201 respectively.

According to said fourth example said instruction 99 is a session initiation protocol message 99, "OK".

Additionally said calling card function server 1001 sends an instruction 100, Request, to request said termination to said online charging system 1003.

According to said fourth example, said instruction 100 is a session initiation protocol based Mr message 100, requesting to close said calling card account on said online charging system 1003.

In response to receiving said instruction 100, said online charging system 1003 performs all operations for terminating said access to said calling card account and sends an instruction 101, Response to said calling card function server 1001.

According to said fourth example, said instruction 101 is a session initiation protocol based Mr message 101 including said current account balance.

Upon receipt of said instruction 101, said calling card function server 1001 sends an instruction 102, Request, including a sixth set of instructions for a sixth announcement, to said media resource function server 1004.

According to said fourth example, said instruction 102 is a media server control mark-up language request including said current account balance.

In response to receiving said instruction 102, said media resource function server 1004 sends an instruction 103, Response, including said first identifier of said media resource function server 1004 to said calling card function server 1001.

According to said fourth example, said instruction 103 is a session initiation protocol message 103, "OK", including said first identifier of said media resource function server 1004.

Upon receiving said instruction 103 said calling card function server 1001 sends an instruction 104, Request, including said first identifier of said media resource function server 1004, to said call session control function server 1002.

According to said fourth example, said instruction 104 is a session initiation protocol message 104, "INVITE", including said first identifier of said media resource function server 1004.

Upon receipt of said instruction 104 said call session control function server 1002 forwards said instruction 104 as message 105, Request, to said first session initiation protocol phone 1200.

According to said fourth example said message 105 is forwarded as message 105, "INVITE", to said first session initiation protocol phone 1200.

Said call session control function server 1002 is adapted to receive an instruction 106, Response, from said first session initiation protocol phone 1200.

According to said fourth example, said instruction 106 is a session initiation protocol message 106 "OK". Additionally said message 106 may include said session initiation protocol description of said first session initiation protocol phone 1200.

Said first session initiation protocol phone 1200 may be adapted to send said instruction 106 in response to receiving said instruction 105.

According to said fourth example, said first session initiation protocol phone 1200 is adapted to send said message 106 in response to receiving said message 105.

Upon receipt of said instruction 106 said call session control function server 1002 forwards said instruction 106 as an instruction 107, Response, to said calling card function server 1001.

According to said fourth example, said instruction 107 is a session initiation protocol message 107, "OK". Additionally said message 107 may include said session initiation protocol description of said first session initiation protocol phone 1200.

Upon receipt of said instruction 107 said calling card function server sends an instruction 108, Response, to indicate the receipt of said message 107 to said media resource function server 1004.

According to said fourth example, said instruction 108 is a session initiation protocol message 108, "ACK".

Additionally said calling card function server 1001 sends an instruction 109, Response, to indicate the receipt of said message 107 to said call session control function server 1002.

According to said fourth example, said instruction 109 is a session initiation protocol message 109, "ACK".

Upon receipt of said instruction 109 said call session control function server 1002 forwards said instruction 109 as an instruction 110 to said first session initiation protocol phone 1200.

According to said fourth example, said message 109 is forwarded as a message 110 to said first session initiation protocol phone 1200.

A fourth connection is established between said media resource function server 1004 and said first session initiation phone 1200 upon receipt of said instruction 110 and said instruction 108 by said first session initiation protocol phone 1200 and said media resource function server 1004 respectively.

According to said fourth example, said fourth connection, is a fourth real time transport protocol link, that is established between said media resource function server 1004 and said first session initiation phone 1200 upon receipt of message 110 and message 108 by said first session initiation protocol phone 1200 and said media resource function server 1004 respectively.

Afterwards a session 111 is established via said fourth connection.

According to said fourth example, said session 111 is established via said fourth real time transport protocol link, using said session initiation protocol descriptions.

During said session 111 said media resource function server 1004 plays, i.e. sends, said sixth announcement according to said sixth set of instructions.

According to said fourth example, said media resource function server 1004 announces said remaining account balance.

Additionally said media resource function server 1004 may request input from said first session initiation protocol phone 1200.

According to said fourth example said media resource function server 1004 may play a prompt to ask whether said first user of said first session initiation protocol phone 1200 wants to continue with a next call or not.

In this case said sixth set of instructions in message 102 contains additional media server control mark-up language expressions to instruct said media resource function server 1004 to prompt for user input.

Afterwards said forth method ends and said next call may be continued according to the second method.

The instructions 101 to 110 as well as the messages 101 to 110 and session 111 are optional. Alternatively the fourth connection between said first session initiation protocol phone 1200 and said calling card function server 1001 may be disconnected by said calling card function server 1001 upon receipt of said instruction 99 and message 99 respectively. Interactions with the online charging system 1003 may be done after the connection ended.

In case any of the aforementioned instruction or messages that are, according to said fourth method, expected to be received from said first session initiation protocol phone 1200 or said second session initiation protocol phone 1201 are not received by said call session control function server 1002 and said calling card function server 1001 respectively, error handling is performed, e.g. the active connection is terminated, as described before.

Hier Weiter Machen

The goal of a fifth method according to the invention is, to enable a user of said first session initiation protocol phone 1200, to disconnect said second connection between said first session initiation protocol phone 1200 and said second session initiation protocol phone 1201.

Figure 6:
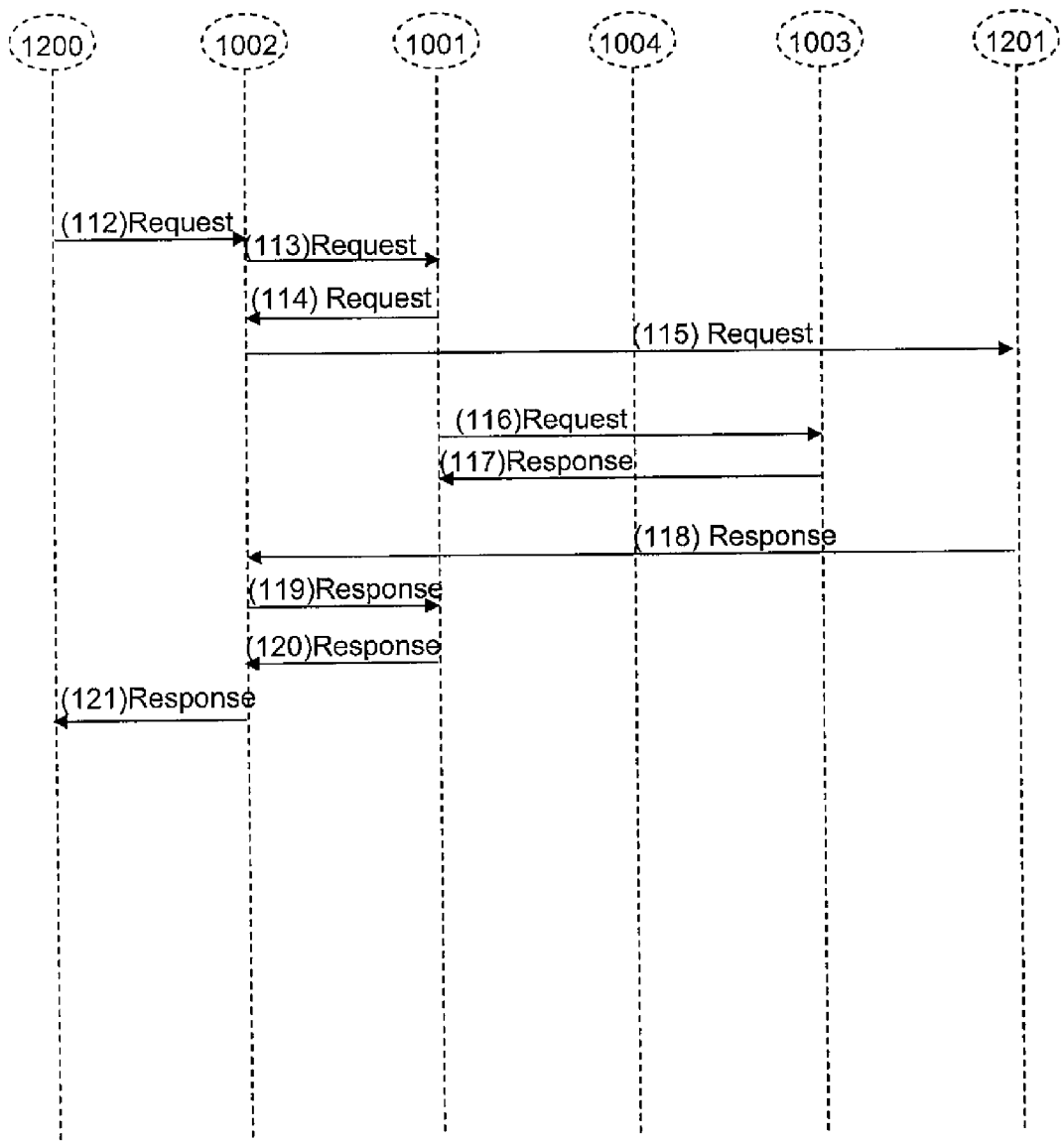
FIG. 6 schematically shows a fifth sequence diagram, showing some typical sequences in a fifth method according to the invention.

Said fifth method and a fifth example of an implementation of said fifth method are described referencing FIG. 6.

Said fifth method starts during said second connection, a soon as said call session control function server 1002 receives an instruction 112, Request, from said first session initiation protocol phone 1200.

According to said fifth example, said instruction 112 is a session initiation protocol message 112, "BYE".

Said first session initiation protocol phone 1200 may be adapted to determine that a user of said first session initiation protocol phone 1200 requests to terminate said second connection, for example from an input to said user interface.

Said first session initiation protocol phone 1200 may be adapted to send said instruction 112 and said message 112, respectively, when said request to terminate said second connection was determined.

Upon receiving said instruction 112 said call session control function server 1002 forwards said instruction 112 as instruction 113, Request, to said calling card function server 1001.

According to said fifth example, said message 112 is forwarded as a session initiation protocol message 113, "BYE", to said calling card function server 1001.

Upon receipt of said instruction 113, said calling card function server 1001 sends an instruction 114, Request, to said call session control function server 1002, in order to request termination of said second connection from said second session initiation protocol phone 1201.

According to said fifth example, said instruction 114 is a session initiation protocol message 114, "BYE".

Upon receipt of said instruction 114 said call session control function server 1002 forwards said instruction 114 as instruction 115, Request, to said second session initiation protocol phone 1201.

According to said fifth example, said message 114 is forwarded as a session initiation protocol message 115, "BYE", to said second session initiation protocol phone 1201.

Additionally said calling card function server 1001 sends an instruction 116, Request, to terminate the use of said calling card account to said online charging system 1003.

According to said fifth example, said instruction 116 is a session initiation protocol based Mr message 116.

In response to said instruction 116 said online charging system 1003 closes said calling card account and sends an instruction 117, Response, to said calling card function server 1001.

According to said fifth example, said instruction 117 is a session initiation protocol based Mr message 117, confirming that said calling card account has been closed.

Additionally said call session control function server 1002 may be adapted to receive an instruction 118, Response, from said second session initiation protocol phone 1201, confirming said disconnection request.

According to said fifth example, said instruction 118 is a session initiation protocol message 118, "OK".

Said session initiation protocol phone 1201 may be adapted to send said instruction 118 and said message 118 in response to receiving said instruction 117 and message 117 respectively.

Upon receiving said instruction 118 said call session control function server 1002 forwards said instruction 118 as an instruction 119, Response, to said calling card function server 1001.

According to said fifth example, said instruction 119 is a session initiation protocol message 119, "OK".

Upon receiving said instruction 119 said calling card function server 1001 forwards said instruction 119 as an instruction 120, Response, to said call session control function server 1002.

According to said fifth example, said message 120 is forwarded as a session initiation protocol message 120, "OK".

Upon receiving instruction 120 said call session control function server 1002 forwards said instruction 120 as in instruction 121, Response, to said first session initiation protocol phone 1200.

According to said fifth example, said message 120 is forwarded as a session initiation protocol message 120, "OK".

Said second connection is released upon receipt of messages 120 and 115 on said first session initiation protocol phone 1200 and said second session initiation protocol phone 1201 respectively.

Afterwards said fifth method ends.

Any other connection in which said first session initiation protocol phone 1200 participates may be terminated by instructions 112, 113, 116, 117, 120 and 121 of said fifth method. For example said first connection may be terminated as described in said fifth method.

In case any of the aforementioned instructions and messages that are, according to said fifth method, expected to be received from said first session initiation protocol phone 1200 or said second session initiation protocol phone 1201 are not received by said call session control function server 1002 and said calling card function server 1001 respectively, error handling is performed, e.g. the active connection is terminated, as described before.

According to any of the methods described above, the receipt of many of the instructions and messages sent is confirmed by a receipt confirmation instructions and message, for example by session initiation protocol responses "OK". Any of the network devices may be adapted to resent messages, in case said receipt confirmation instruction or message was not received within a certain amount of time after sending an instruction or message.

Instructions or messages of the aforementioned methods that need to be forwarded e.g. by said call session control function server 1002, may contain the final destination. According to the aforementioned examples said real time transport protocol address or an internet protocol address of said final destination is included in said messages.

All of the aforementioned instructions that are implemented in any of the aforementioned examples as session initiation protocol based Mr Request and Response messages, may be Diameter Ro Credit Control Requests (well known as CCR) or Credit Control Answers (well known as CCA) respectively. Such Diameter Ro Requests and Answers are well known to a person skilled in the art and particularly used in most of the implementations of said internet protocol media subsystem or a long term evolution networks (well known as LTE networks).

What is claimed is:

1. A system for transferring data related to a calling card function between a server and a plurality of network devices in a telecommunications network, wherein said server is adapted to provide said calling card function, and in that said server is adapted to transfer said data to said network devices via a plurality of packet switched links, wherein at least one of said plurality of network devices is a call session control function server connected with the server via a first packet switched link, at least another one of said plurality of network devices is an online charging system connected with the server via a second packet switched link and at least another one of said plurality of network devices is a media resource function server connected with the server via a third packet switched link.

2. The system according to claim 1, comprising a first user equipment, wherein said server and said first user equipment are adapted to transfer said data via said call session control function server and said first packet switched link.

3. The system according to claim 1, comprising a second user equipment, wherein said server and said second user equipment are adapted to transfer said data via said call session control function server and said first packet switched link.

4. The system according to claim 1, comprising a media resource function server, wherein said server and said media resource function server are adapted to transfer said data via said packet switched link.

5. The system according to claim 4, wherein said media resource function server and a first user equipment are adapted to transfer said data via a fourth packet switched link.

6. The system according to claim 1, wherein said server and a first user equipment are adapted to transfer said data via a circuit switched link.

7. The system according to claim 1, wherein said server and a second user equipment are adapted to transfer said data via a circuit switched link.

8. A server adapted to transfer data related to a calling card function in a telecommunications network via a plurality of packet switched links, said server being adapted to provide said calling card function, wherein said server is connected to (i) a call session control function server via a first packet switched link, (ii) an online charging system via a second packet switched link and (iii) a media resource function server via a third packet switched link.

9. A method for transferring data related to a calling card function in a telecommunications network, wherein said data is transferred between a server providing said calling card function and a plurality of network devices using packet switching, wherein said server is connected to (i) a call session control function server via a first packet switched link, (ii) an online charging system via a second packet switched link and (iii) a media resource function server via a third packet switched link.

10. The method according to claim 9, wherein said data is transferred between said server and a first user equipment using packet switching via the call session control function server and the first packet switched link.

11. The method according to claim 9, wherein said data is transferred between said server and a second user equipment using packet switching via the call session control function server and the first packet switched link.

12. A non-transitory computer readable medium including a program operative to effect transferring data related to a calling card function in a telecommunications network, wherein said program, when executed on a computer, causes the computer to transfer said data between a server providing said calling card function and a plurality of network devices using packet switching, wherein said server is connected to (i) a call session control function server via a first packet switched link, (ii) an online charging system via a second packet switched link and (iii) a media resource function server via a third packet switched link.

* * * * *